Sept. 14, 1965   W. M. SMITH   3,205,847
COMBINATION AQUATIC-GROUND EFFECT VEHICLE
Filed March 23, 1964   2 Sheets-Sheet 1

INVENTOR.
WILLIAM M. SMITH
BY
Beau, Brooks, Buckley & Beau,
ATTORNEYS.

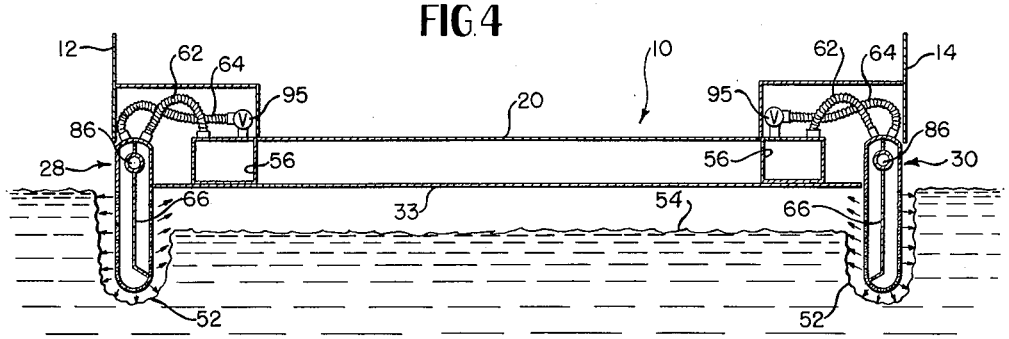
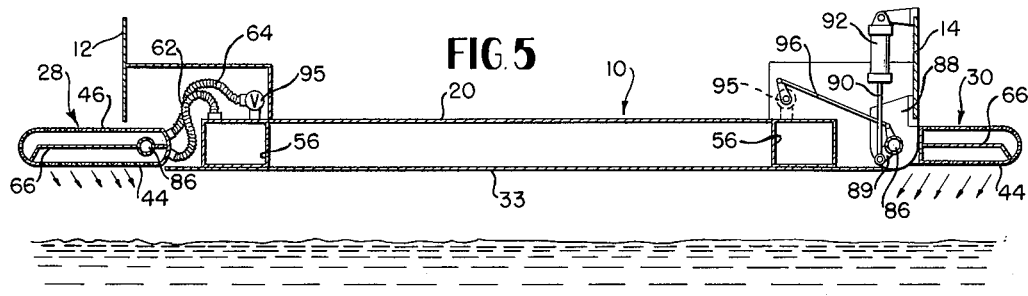
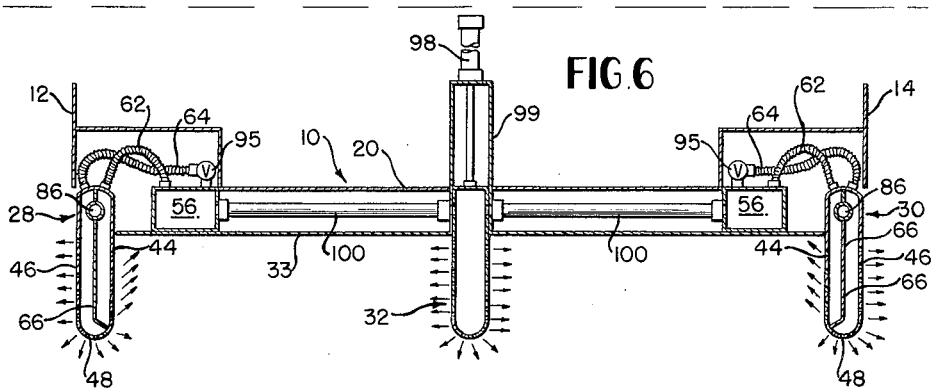
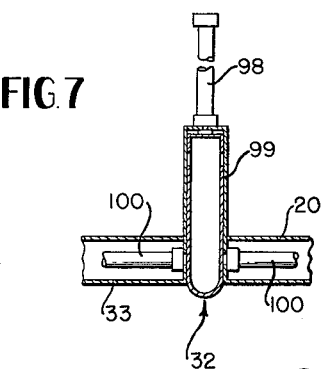

United States Patent Office 3,205,847
Patented Sept. 14, 1965

3,205,847
COMBINATION AQUATIC-GROUND EFFECT
VEHICLE
William M. Smith, Williamsville, N.Y., assignor to Bell
Aerospace Corporation, Wheatfield, N.Y.
Filed Mar. 23, 1964, Ser. No. 353,903
10 Claims. (Cl. 114—67)

This invention relates to aquatic and/or amphibian vehicles; and more particularly to that type of vehicle in which travel friction is materially reduced by the expedient of partially supporting the weight of the vehicle by an entrapped superatmospheric pressured cushion of air disposed between the bottom of the vehicle and the underlying relatively static body of water or other terrain over which the vehicle is operating.

It is a primary object of the present invention to provide improvements in vehicles of the type above described, whereby reduction of frictional drag effects on the vehicle are optimized, so that substantial increases in speed can be obtained in return for the same power output. For example, aquatic vehicles such as are described in Patents 1,656,411, 1,412,848 and 3,027,860 and which are supported in part by air films or cushions confined between skeg devices and bottom surface of the hull and the supporting terrain are subject to certain restrictions with respect to the ultimate speeds with which such craft can travel. Such restrictions are imposed by virtue of the fact that in such prior arrangements substantial amounts of frictional drag still exist between the hull and the body of water over which the hull is traveling; and by virtue of the fact that craft of this type are usually difficult to maneuver and/or stabilize. Furthermore, the prior art types of vehicles above referred to are not adapted to "beaching" or to amphibious operations, and are therefor strictly confined in their usefulness to over-water operations.

In the case of the present invention, the aforesaid disadvantages of the prior art arrangements are overcome by the provision of skegs and/or keel members depending from the hull and extending in the lengthwise direction thereof; said skegs or keel members being provided with gas discharge openings through the side and bottom walls thereof to minimize frictional drag between the skegs or keel members and the supporting body of water. In this way, in addition to the levitating assist effect achieved by the film or cushion of air entrapped beneath the vehicle, substantially frictionless air films are thereby established between the skeg and keel members and the ambient water. Thus, water friction drag effects on the skeg or keel members per se are eliminated, while at the same time the skeg and/or keel members lend stability to the vehicle as it travels over a water surface. Hence the speed capabilities of such a craft are materially increased without corresponding increase of the requisite power output. Also, in the case of the present invention, it is contemplated that the "frictionless" skegs and/or keels may be hingedly mounted relative to the vehicle hull, so as to be swingable into laterally outstanting attitudes relative to the hull such as on occasions when it is desired to convert the aquatic vehicle to amphibious form. Thus, whereas the vehicle travels over a water surface in improved manner, when it is desired to drive it up on a beach or the like and/or to operate it as a "ground effect machine," it is readily convertible to such purposes.

Other more specific objects and advantages of the invention will appear from the specification hereinafter and the accompanying drawing, wherein:

FIG. 4 is a transverse sectional view taken as suggested by line 4—4 of FIG. 2, when the machine is operating as an aquatic vehicle;

Figure 1:
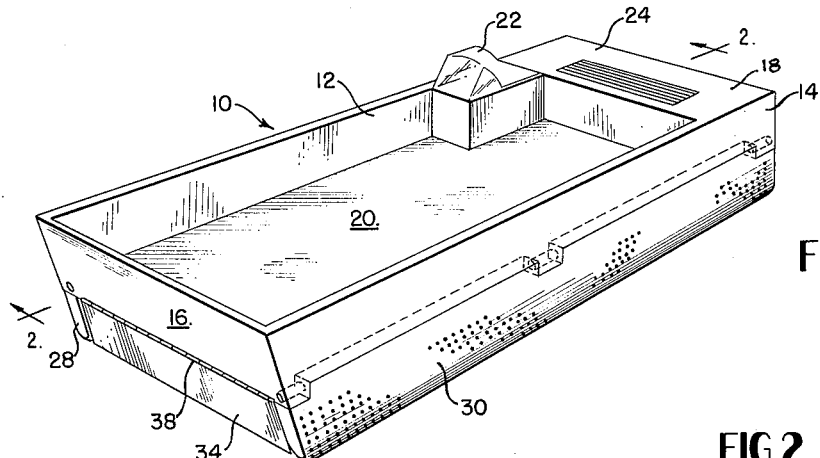
FIG. 1 is a top perspective view by way of example, of one form of vehicle constructed in accordance with the present invention.
Figure 2:
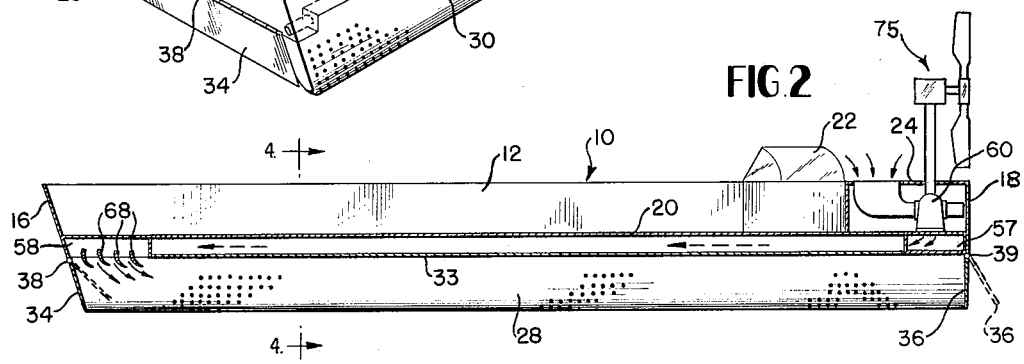
FIG. 2 is a longitudinal section taken as suggested along line 2—2 of FIG. 1.
Figure 3:
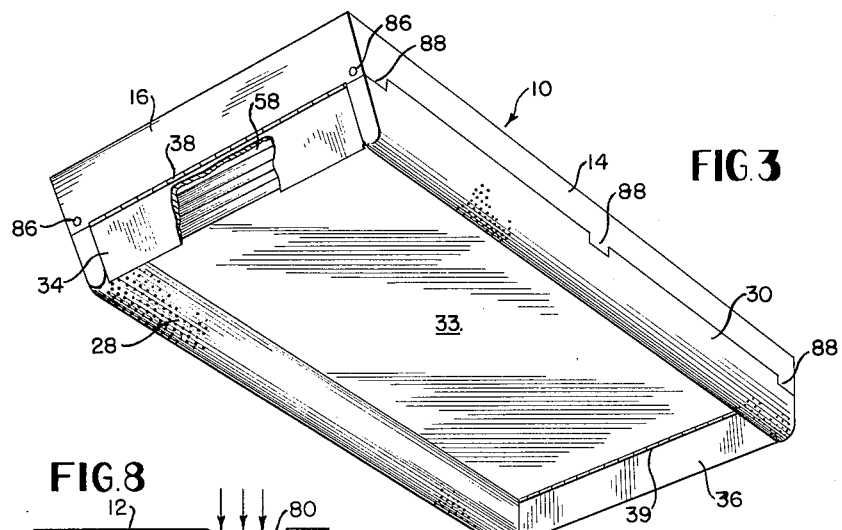
FIG. 3 is a bottom perspective view of the craft shown in FIGS. 1 and 2.
Figure 8:
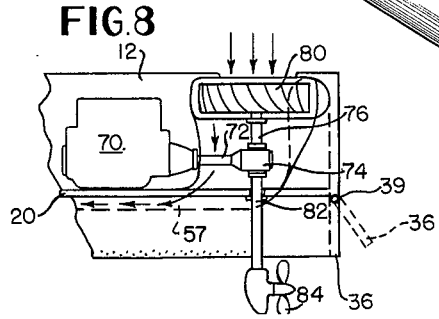

FIG. 5 corresponds to FIG. 4 but shows the vehicle operating as a "ground effect machine";

FIG. 6 corresponds to FIG. 4 but shows a modified form of the vehicle which includes an additional center keel device;

FIG. 7 is a fragmentary sectional view showing the keel member of FIG. 6 retracted for "ground effect machine" operation; and FIG. 8 is a fragmentary sectional view corresponding to the rear portion of FIG. 2 and illustrating a modified form of aquatic propulsion arrangement for the vehicle.

As shown by way of example in the drawing herewith, an aquatic vehicle of the invention as indicated generally therein by the reference character 10, may be constructed to include a flat bottomed hull having opposite side portions 12 and 14; a bow panel 16 and a rear transom portion 18. It is to be understood that the drawing herewith illustrates merely one possible embodiment of the invention; the vehicle being generally of the type such as is particularly suitable for utilization as a landing craft for military purposes. Other different hull designs and configurations may be equally as well utilized in conjunction with the principles according to the present invention. The hull deck of the vehicle is indicated by the reference character 20, and the vessel may include a pilot or navigator's station 22 as well as a closed compartment as at 24 for housing power units of the vehicle.

As shown in FIGS. 1–5, the hull may be provided with a pair of skeg members 28 and 30 normally depending below the bottom of the hull and disposed in longitudinally extending parallel relationship along each side of the vehicle. Whereas in the specific form of the invention illustrated in FIGS. 1–5 of the drawing, two such skeg members are provided, if preferred additional skegs may be provided such as a center skeg or keel as indicated at 32 (FIGS. 6–7) as will be explained in more detail hereinafter. The use of a central keel member 32 will in some cases lend greater stability to the vehicle, particularly at high operating speeds.

Provision for formation of an air pocket at the underside of the hull between the two skeg members 28 and 30, is made by closing off the horizontal bottom surface portion 33 of the hull structure at the front and rear ends thereof by means of hinged flap members 34 and 36 which depend from fore and aft portions of the hull structure below the level of the bottom surface portion 33, as to the bottom levels of the skegs 28, 30. Similarly, in the case of FIG. 6, a pair of pockets beneath the hull are defined by the bottom surface portion 33; the skegs 28, 30; the keel member 32; and the fore and aft hinged flaps 34 and 36 (see FIGS. 1–3). The flaps 34, 36 may be of flat plate form as shown, or may be fabricated of flexible sheet material suitably reinforced but sufficiently pliable to "give" and wipe over the water or ground surface over which the vehicle may be operative. Also, it is contemplated that the ends of the flap plates 34, 36, where they extend adjacent to the skegs, may be fitted with flexible cuffs or fillet devices, such as are shown for example at 51 (FIG. 2) in United States Patent 3,027,860.

The flaps 34, 36 when provided of the flat plate form as shown herein, are individually hinged to the hull structure as indicated at 38, 39 and thus in any case the flaps depend from the fore and aft portions of the hull to cooperate with the skegs in the definition of the pockets heretofore mentioned. However, these flap members deflect as explained hereinabove upon impact with the water or ground surfaces so as to further minimize resistance of the hull in its travel.

In accord with the present invention the skeg members 28 and 30 are of hollow form (as best illustrated in FIGS. 4–6), thereby presenting inner and outer side walls 44 and 46 which are interconnected by a rounded bottom wall portion 48 substantially as is shown in FIG. 6. The side walls 44 and 46, as well as the bottom wall 48, are provided with gas bleed openings as suggested by the gas flow indicating arrows in the drawing. Pressured air or gas is pumped into the skegs as will be explained hereinafter, and thus as shown in FIG. 4, when the machine is operating as an aquatic vehicle the water adjacent the skegs is pushed away and a film of air forms therebetween, the depressed water line being indicated by reference character 52 whereas the static water line is indicated by reference character 54. When the center keel is employed as shown in FIGS. 6, 7, it is also preferably of hollow form, and air bleed openings are provided therein as suggested by the gas escape indicating arrows of FIG. 6.

As shown in FIGS. 4, 5, 6, the space between the horizontal hull plates 20, 33 may be longitudinally partitioned to provide a pair of compressed gas (or air) ducts 56, 56, running along opposite sides of the hull, which are interconnected at the rear and front ends of the hull by means of cross ducts 57, 58 (FIG. 2). An air compressor or blower, or other supplier of gas under superatomspheric pressure, is provided as indicated at 60, to pump air (or gas) into the duct 57 and thence through side ducts 56, 56 and into the forwardly located cross duct 58. At one or more positions longitudinally of the machine the side ducts 56, 56 are fitted with flexible hoses 62, 64 leading into opposite sides of the skegs 28, 30 which are internally partioned as indicated at 66, whereby to feed the skegs with compressed air (or other gas) for reducing the frictional water drag as explained hereinabove. The fore cross duct 58 also in communication with the supply ducts 56, 56 is of open bottom form and may be provided with louvres 68 (FIG. 2) for discharging the bulk of the pressured air downwardly and rearwardly into the pocket under the vehicle; that is, below the bottom surface portion 33 of the hull. By virtue of this arrangement the pressured gas or air creates a film or cushion under the vehicle and also bleeds outwardly through the openings in the skeg side walls substantially as is shown in FIG. 4 to provide friction-reducing air films between the surfaces of the skegs and the adjacent water.

Alternatively, separate pump means may be provided to deliver air to the pocket under the hull and to the interiors of the various skeg members. For example, it may be desired to provide a relatively low pressure source for directing air to the main lift pocket under the hull while providing a relatively high pressure source for discharge through the bleed openings in the skeg side walls. Also, it will be appreciated that the air (or gas) pumping means may be disposed at the front end of the machine, or at any other position threon, in lieu of the stern end location as shown in FIG. 2.

The means for propelling the vehicle may be either driven by the pump motor or entirely independent and separate therefrom. For example, any conventional water or air propeller type propulsion means may be provided, or the thrust effect of a jet engine may be utilized; or any other desired independent propulsion means for the vehicle may be employed. On the other hand, by way of example, a common drive means may be utilized as is shown in FIG. 8 wherein a common prime mover 70 operates through a drive shaft 72 which is coupled, through a suitable gear box 74 both to the driving shaft 76 of the air induction means 80 and to the drive shaft 82 of a conventional water propeller mechanism 84. Thus, the fan 80 will drive air down into the duct 57 for purposes explained hereinabove, while the same power plant drives the propeller 84. Or, as shown by way of further example, in FIG. 2, the engine driving the air pump 60 may also be clutched to a geared propeller system as indicated generally at 75. Air propeller systems for propulsion and/or steering of water craft are well known in the art as shown for example in Patent No. 2,972,327.

As shown in FIGS. 3–6, the skegs 28, 30 are hingedly mounted to the hull structure as by means of hinge pins 86 and such as by appropriately spaced hanger portions 88 (FIG. 3) of the hull structure; and the skegs are controlled as to attitude by any suitable means. For example as shown in FIG. 5, control horns 89 may be keyed to extend from the hinge rods into connection with struts 90 operated by pneumatic or hydraulic jacks as illustrated at 92, to alternatively position the skegs as shown in FIGS. 4 and 5. As previously explained, when in the positions of FIG. 4 the skegs support the machine in aquatic vehicle form but in improved manner in that the water friction drag effects are materially reduced. On the other hand, when it is desired to operate the vehicle as a ground effect machine, the skegs are retracted to the position shown in FIG. 5. This not only withdraws the skegs from harmful ground contacts but effectively increases the planform area of the machine under which the levitating cushion of air (or gas) reacts.

Furthermore, the air bleed apertures or jet openings through the underside wall portions of the skegs are directed as shown by the gas flow indicating arrows of the drawing, so as to discharge the gas not only downwardly but also inwardly, thereby providing in effect an inwardly inclined peripheral jet or wall of pressured gas which tends to retain the cushion forming gas under the body of the vehicle. Also, the openings through the skeg walls are preferably directed slightly rearwardly, and perhaps louvred at their outer ends if preferred, to provide an air flow induction effect (due to motion of the vehicle relative to the water) which reduces the power required for delivering the air to the points of air film formation. To facilitate the "ground effect" performance the machine includes means automatically operable during the conversion process to de-energize the air (or gas) outlet ports through the outside (or topside) wall portions of the skegs. For example, as shown at 95 (FIGS. 4–6) valves may be provided to shut off air flow through the hoses 64 when the skegs are swung to outstanding horizontal position; the valves 95 being controlled by crank and rod means as indicated at 96. Thus, maximum levitation effect is obtained, as the vehicle readily converts from an aquatic vehicle to a ground effect machine.

As shown in FIGS. 6, 7, one or more additional skeg or keel devices may be provided as indicated at 32, intermediately of the skegs located at the opposite sides of the machine, for stability augmentation purposes, particularly at higher speeds. The keel or skeg 32 will also be of hollow form and apertured through the walls thereof to provide for the gas bleed and water friction reduction effect referred to hereinabove. To facilitate conversion of the vehicle to ground effect machine form, the center keel is preferably retractable, as to the position shown in FIG. 7; and this may be easily arranged for automatically through use, for example, of a piston-cylinder jack 98 carried by the hull structure and coupled to the keel member for pulling it up into a receiver or well portion 99 of the hull. The retraction of the keel into the receiver 99 may be arranged to automatically cut off the air (or gas) supply to the interior of the keel, which normally arrives through conduits 100—100 leading from the ducts 56, 56.

In lieu of use of jet-like apertures through the walls of the skeg and keel members as explained hereinabove, any other suitable means may be employed to provide for creating the desired film of air (or gas) between the members and the adjacent water when the machine is operating as an aquatic vehicle. For example, the walls of the skegs or keel members may be formed of porous material of any suitable fabrication, such as sintered metal, or a porous ceramic, or a mesh-like structure; according to the degree of porosity desired and other engineering considerations.

Thus, it will be appreciated that the machine of the invention is of improved tactical versatility, and is adapted to operate for example with improved facility in deep water, shallow water, beach slopes, and customary ground terrain. The machine may be operated either conventionally as a boat, or as an air-lubricated hull aquatic type vehicle, or as a ground effect machine; and in all cases with improved performance capabilities. If desired, the hull of the vehicle may be fitted with ground wheels (preferably retractable) to facilitate ground surface travel; and such wheels may be arranged for steering and ground travel propulsion purposes if also desired.

Although only a few forms of the invention have been illustrated and described in detail herein, various changes may be made therein without departing from the spirit of the invention or the scope of the following claims.

I claim:

1. An aquatic vehicle adapted to be supported by a cushion of entrapped air therebelow, comprising,
   a hull provided with propulsion means and means for delivering pressurized air,
   said hull having a substantially flat bottom surface and a pair of longitudinally extending and depending skegs hingedly mounted to the hull and swingable between horizontally and laterally extending positions beyond the planform profile of said bottom surface and vertically depending positions laterally bounding said bottom surface,
   wall means hingedly depending from the fore and aft regions of said bottom surface to form, with said skegs and said bottom surface when said skegs are in vertically depending positions, a downwardly facing pocket to encompass a cushion of superatmospheric pressured air,
   said skegs being hollow and interiorly connected in communication with said means for delivering pressurized air, and there being air outlet openings through the bottom and side walls of said skegs substantially throughout the lengths thereof.

2. The vehicle as defined in claim 1 wherein each of said skegs is of generally U-shaped cross sectional form and having inner and outer walls and a connecting bottom wall, said openings being present in all of said walls,
   and valve means automatically operable to close off air discharge from the openings through the outer walls of skegs whenever the latter are swung into horizontally and laterally extending positions relative to said hull.

3. An aquatic vehicle comprising, in combination,
   a hull having a downwardly facing pocket, said pocket being defined by longitudinally extending and transversely spaced skeg members, a generally horizontal bottom surface portion between said skeg members, said skeg members being hingedly mounted to the hull and swingable between horizontally and laterally extending positions beyond the planform profile of said bottom surface and vertically depending positions,
   each of said skeg members being of hollow form to present inner and outer walls connected by a bottom wall, said inner, outer and bottom walls being provided with air bleed openings,
   means for discharging superatmospheric pressured air into said skeg members and into said pocket,
   and valve means automatically operable to close off air discharge from the openings through the outer walls of skegs whenever the latter are swung into horizontal and laterally extending positions relative to said hull.

4. In an aquatic vehicle, in combination,
   a hull including a flat bottom member, a plurality of skeg members extending longitudinally of said bottom member, and hingedly mounted to the hull and swingable between horizontally and laterally extending positions beyond the planform profile of said bottom surface and vertically depending positions,
   said skeg members being hollow and being formed with air discharge openings through the walls thereof, means for discharging a film of air beneath said bottom member,
   means for introducing superatmospheric pressured air into said skeg members,
   and valve means automatically operable to close off air discharge from the openings through the outer walls of skegs whenever the latter are swung into horizontally and laterally extending positions relative to said hull.

5. A combination amphibian and ground effect vehicle adapted to be supported from therebelow on a cushion of air, said vehicle comprising,
   a hull having a substantially flat bottom surface provided with skeg means directed longitudinally of said hull and normally extending therebelow,
   flexible curtain means depending transversely of said hull and from the fore and aft regions of said bottom surface to form a downwardly facing pocket in cooperation with said skeg means and said bottom surface, to encompass a cushion of superatmospheric pressured air,
   means carried by said hull for delivering pressurized air into said pocket,
   said skeg means being hollow and having air outlet openings through the walls of said skeg means substantially throughout the lengths thereof, and said skeg means being interiorly connected in communication with said means for delivering pressurized air,
   and means operable to displace said skeg means between extended and retracted positions relative to said hull bottom surface.

6. A convertible aquatic-ground effect vehicle, said vehicle comprising,
   a hull having a substantially flat and rigid bottom portion provided with a plurality of longitudinally directed skegs hingedly mounted relative to said hull along the opposite sides thereof,
   control means operable to cause said skegs to depend downwardly below said hull when said vehicle is operating in the aquatic vehicle mode and to cause said skegs to swing upwardly and outwardly into laterally extending positions supplementing the planform area of said hull bottom portion when said vehicle is operating in the ground effect machine mode,
   flexible curtain means depnding transversely of said hull and from the fore and aft regions of said bottom surface to form a downwardly facing pocket in cooperation with said skegs and said bottom surface when said skegs are disposed in depending position to encompass a cushion of superatmospheric pressured air under said hull,
   means carried by said hull for delivering pressurized air into said pocket,
   said skegs being hollow and having air outlet openings through the opposite side walls of said skegs substantially throughout the lengths thereof and said skegs being interiorly connected in communication with said means for delivering pressurized air,
   and means electively operable to close off the air outlet openings through the upwardly disposed walls of said skegs when the latter are disposed in their outwardly extending positions.

7. A convertible aquatic and ground effect vehicle, said vehicle comprising,
   a hull having a substantially flat bottom surface, said hull being provided with skeg means directed longitudinally of said hull and hinged to said hull and swingable between downwardly depending and outwardly extending positions therefrom,
   flap means hingedly depending transversely of said hull from the fore and aft regions of said bottom surface to form a downwardly facing pocket in cooperation with said skeg means and said bottom surface when said skeg means are in downwardly depending positions to encompass a cushion of superatmospheric pressured air,
   means carried by said hull for delivering pressurized air into said pocket,
   and means operable to displace said skeg means between extended and retracted positions relative to said hull bottom surface.

8. A convertible aquatic-ground effect vehicle, said vehicle comprising,
   a hull having a bottom portion provided with longitudinally directed skeg means hingedly mounted relative to said hull,
   control means operable to cause said skeg means to depend downwardly below said hull when said vehicle is operating in the aquatic vehicle mode and to cause said skeg means to swing into laterally extending position when said vehicle is operating in the ground effect machine mode,
   flap means hingedly depending transversely of said hull and from the fore and aft regions of said bottom portion to form a downwardly facing pocket in cooperation with said skeg means and said bottom surface when said skeg means are disposed in depending position to encompass a cushion of superatmospheric pressured air under said hull,
   and means carried by said hull for delivering pressurized air into said pocket.

9. A convertible aquatic-ground effect vehicle of air, said vehicle comprising,
   a hull having a substantially flat and rigid bottom portion provided with a longitudinally directed skeg hingedly mounted relative to said hull along each of the opposite sides thereof,
   control means operable to cause said skegs to depend downwardly below said hull when said vehicle is operating in the aquatic vehicle mode and to cause said skegs to swing upwardly and outwardly into laterally extending positions supplementing the planform area of said hull bottom portion when said vehicle is operating in the ground effect machine mode,
   flexible curtain means depending transversely of said hull and from the fore and aft regions of said bottom surface to form a downwardly facing pocket in cooperation with said skegs,
   means carried by said hull for delivering pressurized air into the pocket formed by said skegs and said bottom surface when said skegs are disposed in depending position thereby providing a cushion of superatmospheric pressured air under said hull,
   said skegs being hollow and having air outlet openings through the opposite side walls thereof and said skegs being interiorly connected in communication with said means for delivering pressurized air,
   and means electively operable to close off the air outlet openings through the upwardly disposed walls of said skegs when the latter are disposed in their outwardly extending positions.

10. A combination amphibian and ground effect vehicle adapted to be supported from therebelow on a cushion of air, said vehicle comprising,
    a hull having a substantially flat bottom surface provided with a plurality of longitudinally extending and depending skegs,
    flexible curtain means depending transversely of said hull and from the fore and aft regions of said bottom surface to form a downwardly facing pocket in cooperation with said skegs and said bottom surface, to encompass a cushion of superatmospheric pressured air,
    means carried by said hull for delivering pressurized air into said pocket,
    said skegs being hollow and having air outlet openings through the walls of said skegs substantially throughout the lengths thereof, and said skegs being interiorly connected in communication with said means for delivering pressurized air, said skegs being hingedly connected to said hull to be swingable between vertically depending and laterally outstanding attitudes relative to said hull, and valve means operable to deenergize the outwardly and upwardly directed air outlet openings of said skegs when the latter are displaced out of vertically standing attitudes.

References Cited by the Examiner

UNITED STATES PATENTS

| | | | |
|---|---|---|---|
| 2,322,790 | 6/43 | Cristadoro | 114—67 |
| 3,027,860 | 4/62 | Priest | 114—67 |
| 3,141,436 | 7/64 | Cathers et al. | 114—67 |

MILTON BUCHLER, *Primary Examiner.*

FERGUS S. MIDDLETON, *Examiner.*